Feb. 28, 1956  W. H. PHELPS  2,736,389
DRIVE MECHANISM FOR A POWER MOWER
Filed Nov. 6, 1951  3 Sheets-Sheet 1
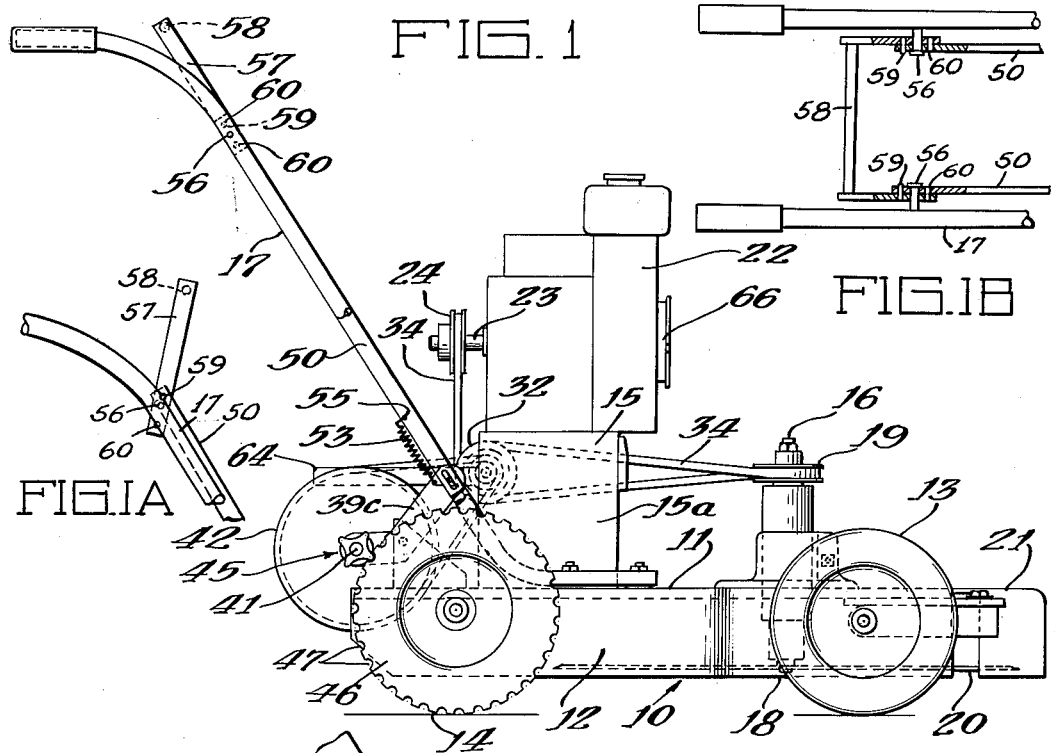
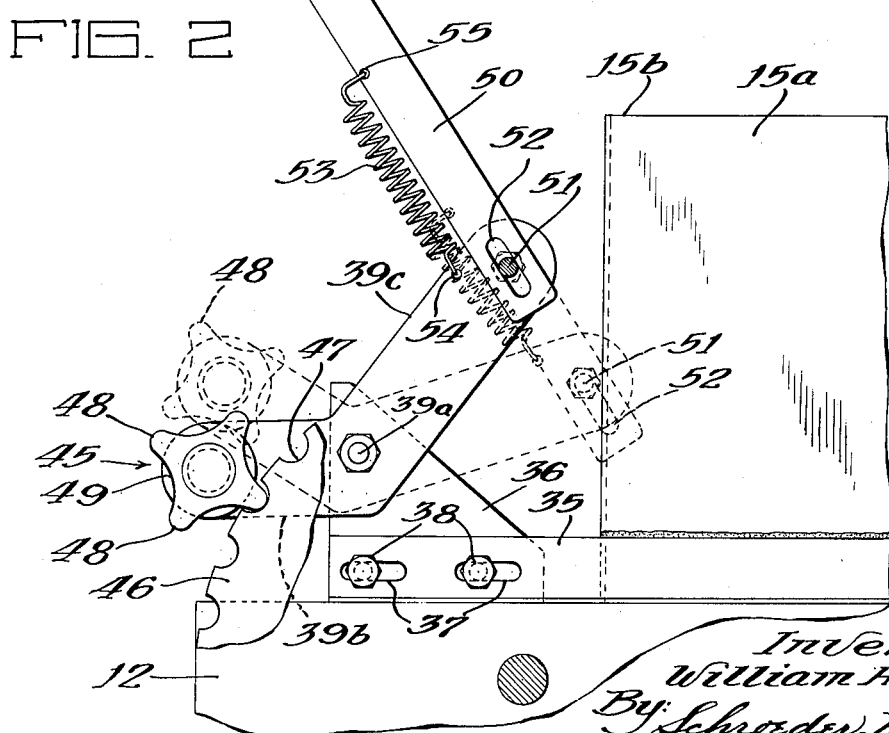
Inventor:
William H. Phelps
By: Schroeder, Merriam,
Hofgren & Brady
Attorneys Feb. 28, 1956 W. H. PHELPS 2,736,389
DRIVE MECHANISM FOR A POWER MOWER
Filed Nov. 6, 1951 3 Sheets-Sheet 2
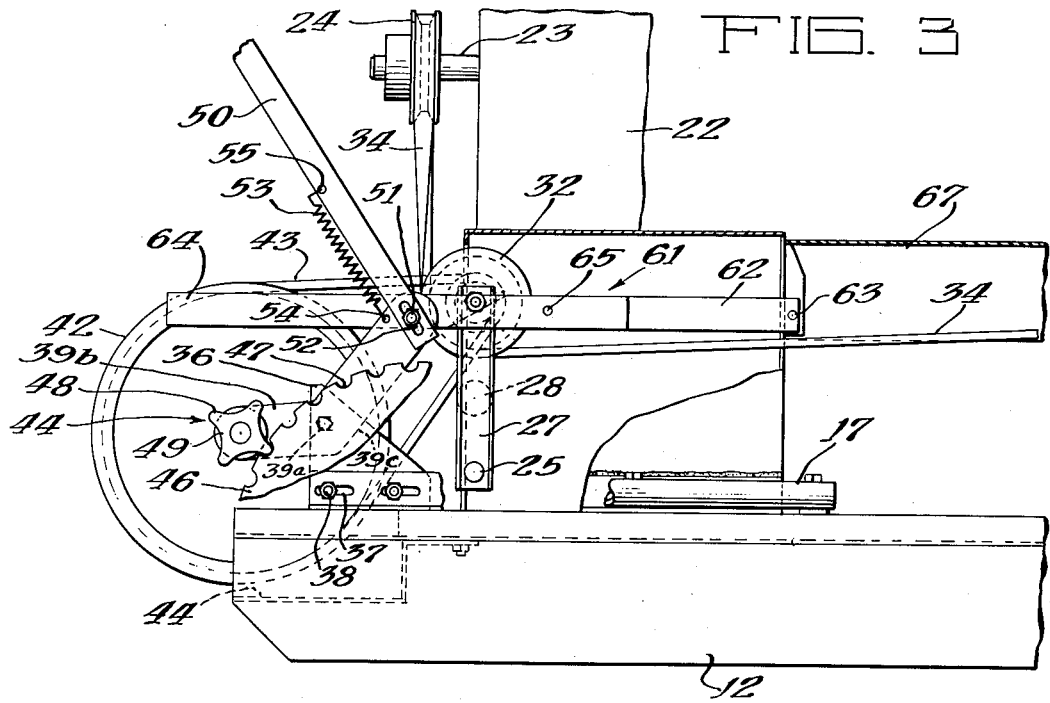
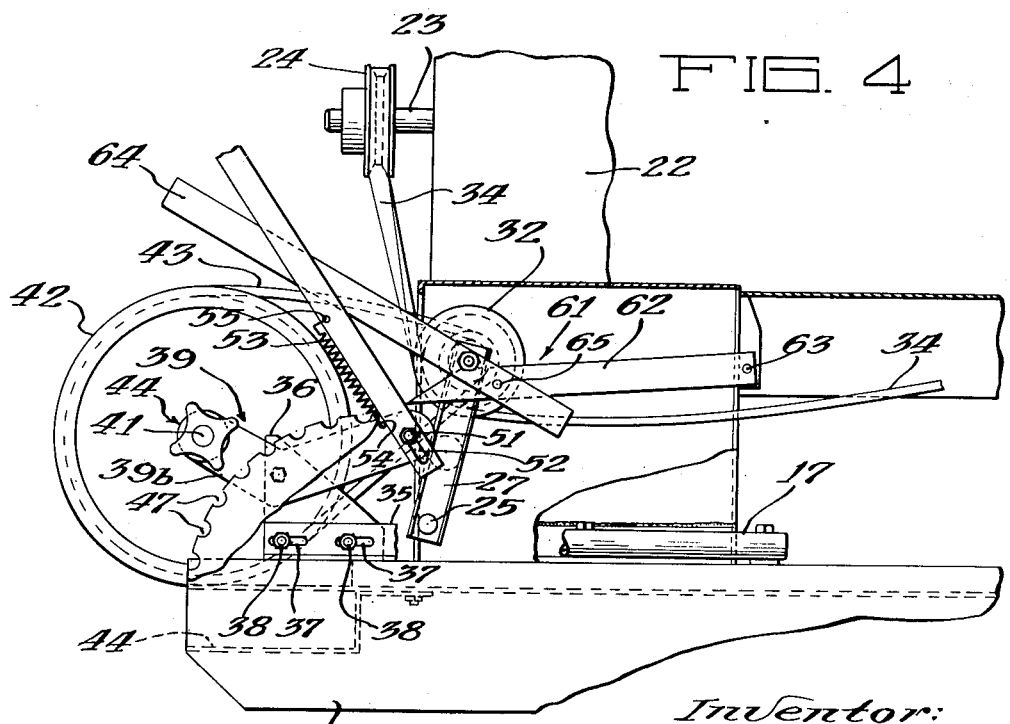
Inventor:
William H. Phelps
Schroeder, Merriam,
Hofgren & Brady
Attorneys

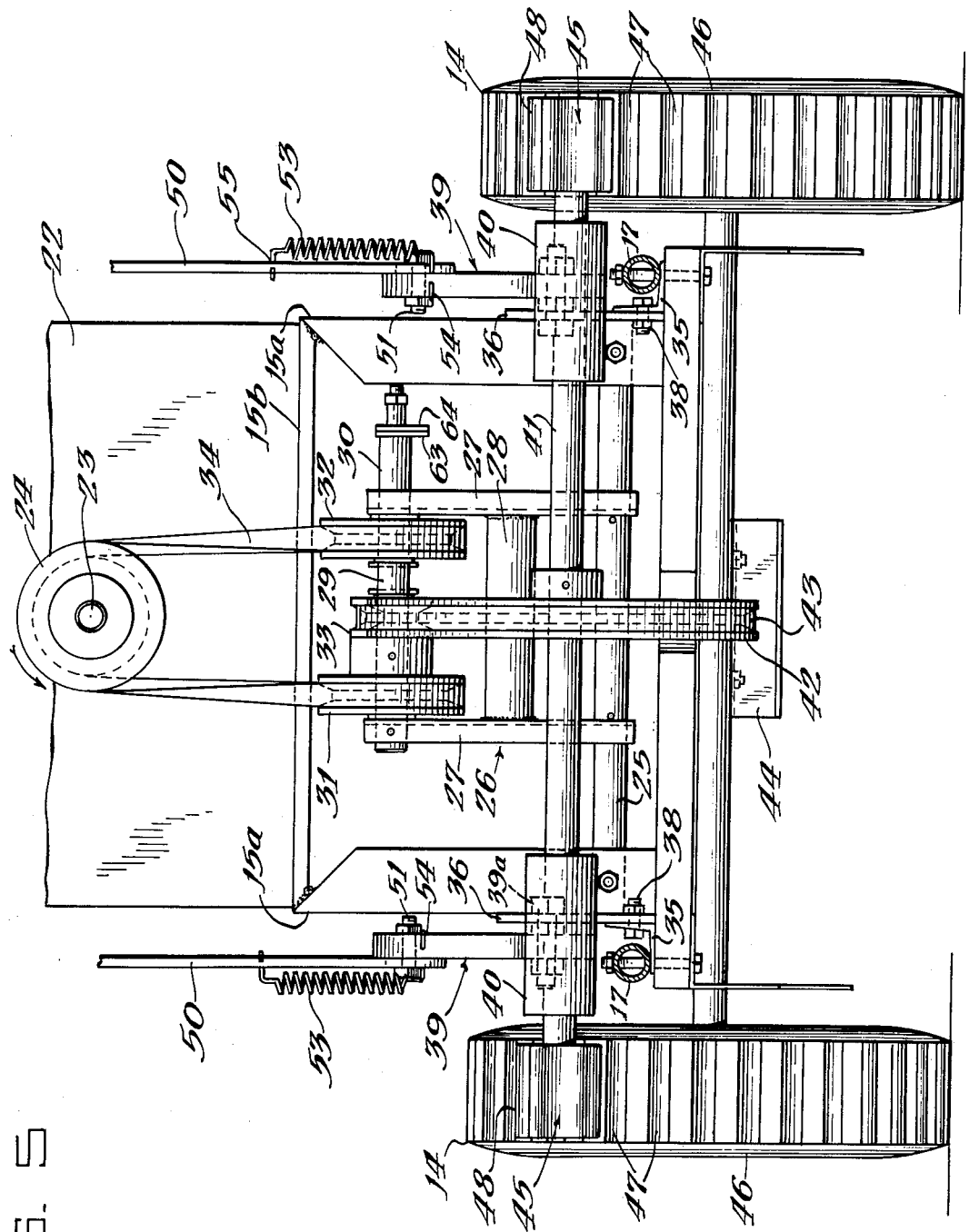

United States Patent Office 2,736,389
Patented Feb. 28, 1956

2,736,389

DRIVE MECHANISM FOR A POWER MOWER

William H. Phelps, Ralston, Nebr.

Application November 6, 1951, Serial No. 255,065

6 Claims. (Cl. 180—19)

This invention relates to a drive mechanism for power driven wheeled vehicles such as lawn mowers, rotary snow plows and the like.

The principal object of the invention is to provide a light, rugged and inexpensive drive mechanism for power mowers and other wheeled vehicles which requires but little basic modification from a hand propelled unit.

Another object of the invention is to provide a mower or other hand guided implement which has a driving mechanism that is easily engaged or disengaged, and that is light enough in weight that the implement may be readily hand propelled when desired.

Another object is to provide a drive mechanism which utilizes a grooved tire in combination with a pinion of special shape as the means for transmitting power from the motor to the wheels.

Still another object is to provide a vehicle in which the motor may be completely disengaged for starting so as to permit the use of a motor of smaller horsepower than is otherwise possible.

A preferred embodiment of the invention is illustrated in the accompanying drawings as applied to a mower of the type in which a four wheeled platform has a horizontally rotating cutter blade; and Fig. 1 is a side elevation of a mower equipped with the driving mechanism of the invention; Fig. 1A is a fragmentary view of the handle like Fig. 1 but with the control link mechanism for the drive pinions in disengaged position; Fig. 1B is a fragmentary plan view of the control link mechanism; Fig. 2 is a fragmentary, detailed side elevation of the mechanism for disengaging the drive pinion, the disengaged position being shown in broken lines; Fig. 3 is a fragmentary side elevation of the driving mechanism with parts broken away, showing the mechanism in engaged position; Fig. 4 is a view similar to Fig. 3 showing the mechanism in "starting" position; and Fig. 5 is a fragmentary rear elevational view of a mower equipped with the driving mechanism.

Referring to the drawings in greater detail, and referring particularly to Fig. 1, a power mower, which is illustrative of the type of vehicle in which the invention may be employed, consists of a frame, indicated generally at 10, having a platform 11 and side plates 12. The frame 10 is supported on a pair of front wheels 13 and a pair of rear wheels 14. Mounted upon the frame are a motor support 15 having side plates 15a and a top plate 15b, a mower assembly 16 and a pair of handles 17 for guiding the mower, said handles preferably having a cross bar at their upper ends. The mower head is of a conventional type having a vertical spindle 18 provided at its upper end with a pulley 19 and at its lower end with a horizontally disposed cutter blade 20. At the front of the frame 10 is a guard 21.

A gasoline motor, indicated generally at 22 is mounted on the top plate 15b of the motor support 15 and has a horizontally disposed shaft 23 at the rear end of which is a drive pulley 24. As best seen in Fig. 5, a transverse fixed axle 25 is secured to the lower portion of the motor support side plates 15a, and has journalled thereon a rocker arm assembly, indicated generally at 26, which consists of a pair of spaced rocker arms 27 and an integral spacer bar 28. At the upper end of the rocker arm assembly 26 is an intermediate shaft 29 which is fixedly secured in the rocker arms 27 and has a portion 30 extending laterally beyond one of said arms. Journalled on said shaft are a pair of power pulleys 31 and 32, and a driven pulley 33 which is formed integrally with the power pulley 31 so as to turn on the shaft 29 with said power pulley. A power V-belt 34 extends around the motor pulley 24, the power pulley 31, forward between the upright sides 15a and beneath the top plate 15b of the motor support 15, around the pulley 19 on the mower shaft, and returns to the motor pulley 24 over the second power pulley 32. Preferably a belt guard 67 overlies the power belt 34 and extends below it on both sides.

On the platform 11, and extending rearwardly from the side plates 15a of the motor support are a pair of angle members 35 upon which are slidably mounted a pair of drive shaft supporting plates 36, which have longitudinal slots 37 to receive bolts 38 which extend through said slots and through apertures in the angle members 35 to permit longitudinal adjustment of said plates 36. Pivotally mounted on the drive shaft support plates 36 on bolts 39a are a pair of bell cranks, indicated generally at 39, which have rearwardly extending arms 39b and forwardly and upwardly extending arms 39c. Formed integrally with the outer extremities of the arms 39b of the bell cranks are a pair of elongated transverse journal members 40 in which a drive shaft 41 is rotatably supported, the drive shaft 41 being provided with a pulley 42. A drive belt 43 extends around the drive pulley 33 on the intermediate shaft 29 and around the pulley 42 so that when the motor 22 is operated to rotate the power pulley 31 and the drive pulley 33, the drive shaft 41 will also rotate. The direction of rotation of the motor pulley is indicated by the arrow in Fig. 5. Mounted beneath the platform 11 is a V-shaped deflector plate 44 which prevents grass clippings and dirt from fouling the pulley 42.

At each end of the drive shaft 41 there is a four toothed pinion 45, said pinions 45 being positioned in alignment with drive tires 46 on the rear wheels 14. As best seen in Figs. 4 and 5, the drive tires 46 on the rear wheels 14 are provided with transversely extending grooves 47 which are evenly spaced around the entire tread portion of the tire. The mower is driven by engagement of teeth 48 on the pinions 45 with the grooves 47 in the tread surfaces of the drive tires 46.

As best seen in Figs. 2 and 3, the four toothed pinions 45 are of unique shape, the teeth 48 thereof being more in the nature of elonagted rounded ribs than true gear teeth, and the diameter of the pinions 45 at the root of the pinions, indicated at 49, is very much less than is the diameter taken at the apex of the teeth, so that the teeth are quite long. Furthermore, the width of the teeth 48 is substantially less than the width of the grooves 47 in the drive tires 46, so that the teeth fit loosely in the grooves so as to enter and leave the grooves with a sliding, or wiping action, which tends to keep the grooves free of mud and grass clippings. The pinions 45 and drive tires 46 are thus substantially self-cleaning.

In order that the pinions 45 may be either engaged or disengaged with the drive tires 46, a pair of drive control links 50 are secured to the arms 39c of the bell cranks, and extend upwardly along the handles 17. The connection between the control links 50 and the bell crank arms 39c is by means of pins 51 on the bell cranks which engage slots 52 in the control links, so that the bell cranks 39 float with respect to the control links 50. A pair of tension springs 53 are hooked into eyes 54 in the bell crank arms 39c and into eyes 55 in the control links 50, so as to urge the pinions 45 into engagement with the grooves 47 in the drive tires 46.

As best seen in Fig. 1B, a pair of bolts 56 adjacent the upper ends of the handles 17 provide pivots for control link operating arms 57 which are connected by a cross bar 58. The control links 50 are secured to the operating arms 57 by means of bolts 59 extending through apertures 60 in the control links. The control links have three apertures 60, so that the normal position of the bell cranks 39 may be varied by putting the bolts through one or another of the holes 60. When the mower is in use, and the drive pinions 45 are engaging the drive tires 46 as shown in Fig. 1, disengagement is effected by pushing forward on the cross bar 58 to pivot the actuating arms 57 forward, jackknifing them with respect to the control links 50 and moving said control links downwardly. This moves the bell cranks 39 from the full line position of Fig. 2 to the dotted position of Fig. 2, disengaging the pinions 45 from the grooves 47 in the drive tires 46.

In order to facilitate starting the motor 22, mechanism is provided for tilting the rocker arms 27 forwardly about the shaft 25, so as to release the tension on the power belt 34. This is accomplished by means of a toggle lever mechanism, indicated generally at 61, the forward lever 62 of the toggle being pivoted at 63 to the motor support, and the rearward lever 64 of the toggle being pivoted to the projection 30 on the intermediate shaft 29. Said levers are pivotally connected by a pivot 65 which is located immediately forward of the connection between the lever 64 and the shaft extension 30. Fig. 3 shows the relative positions of the toggle levers 61 and the rocker arms 27 when the power belt 34 is engaged by the pulleys, and illustrates the toggle action by which the rocker arms 27 are rigidly positioned; while Fig. 4 shows the relative positions of the same parts when the rocker arms have been swung forward to release the tension on the power belt 34. As is plain from Fig. 4, in order to release the tension on the power belt it is merely necessary to move the rearwardly projecting end of the lever 64 upwardly, jackknifing that lever and the lever 62 about the pivot 65 so as to tilt the rocker arms 27 forwardly.

The operation of the device is believed to be clear from the foregoing description. When it is desired to start the mower, the operating arms 57 at the top of the handle 17 are pivoted forward to move the links 50 and swing the bell cranks 39, thus disengaging the pinions 45 from the drive tires 46. Likewise, the rearwardly projecting lever 64 is swung up to release the tension on the power belt 34. The motor 22 may then be started by wrapping a rope around the starter head 66 of the motor and spinning it in the customary fashion. When the motor is operating, the lever 64 may be pushed down to straighten the toggle 61 and tension the power belt 34 to begin the driving of the mower blade 20. This also starts the rotation of the drive shaft 41, and thus of the pinions 45. The drive mechanism may then be engaged by pulling the actuating arms 57 rearwardly, to mesh a tooth 48 of each pinion 45 with the adjacent groove 47 of the corresponding drive tire 46. The mower then will move forward under its own power and need only be guided by the operator.

There are several additional advantages in the particular construction shown in the drawings. Thus, for example, the use of a long power belt 34 which extends forward under the motor tends to make the belt heat less in use, due to the relatively long travel between pulleys which gives it an opportunity to cool. Relatively long belt life is the result of this construction. Furthermore, the relatively high motor support 15 places the motor 22 sufficiently high above the ground that it receives very little dust and grass clippings as the mower operates. This is an important factor in avoiding carburetor failures.

The foregoing detailed description is given for clearness of understanding only and no unnecessary limitations are to be understood therefrom, as some modifications will be obvious to those skilled in the art.

I claim:

1. A power driven vehicle comprising: a generally rectangular frame having front and rear wheels adjacent its four corners; handle means extending upwardly and rearwardly from the frame; drive tires on the rear wheels; an elevated motor support; a motor on said support having a pulley on its drive shaft; a transverse intermediate shaft below the motor, said shaft having three pulleys; a driven element forward of the motor which has a shaft provided with a pulley; a power belt extending from the pulley on the drive shaft, over a pair of said pulleys on the intermediate shaft, forward beneath the motor support and around the pulley on the driven element; a transverse drive shaft connected by a belt to the third said pulley on the intermediate shaft, the ends of said drive shaft being provided with means which make driving engagement with the drive tires; and drive control means for disengaging said means from the drive tires.

2. The power driven vehicle of claim 1 in which the drive control means includes a pair of bell cranks on which the drive shaft is mounted, and a pair of operating links secured to the bell cranks which extend upwardly along the handle means to control the position of the bell cranks.

3. In a drive mechanism for a wheeled vehicle: a drive tire on a wheel of the vehicle having evenly spaced transverse round bottomed grooves in its tread portion; and a rotatable pinion having teeth which make driving engagement with said grooves in said tire, said teeth being substantially longer than the depth of the transverse grooves in the tire, and the end portions of said teeth being rounded and being substantially narrower than said tire grooves so as to produce a wiping action in the grooves when rotating therewith.

4. In a drive mechanism for a wheeled vehicle: a drive tire on a wheel of the vehicle having evenly spaced relatively shallow round bottomed transverse grooves in its tread portion; and a rotatable pinion having four teeth which make driving engagement with said grooves in said tire, said teeth having the form of high rounded ribs with the tooth radius of the pinion substantially greater than the root radius thereof, the teeth being substantially longer than the depth of the transverse grooves in the tire and the end portions of said teeth being substantially narrower than said tire grooves so as to produce a wiping action in the grooves when rotating therewith.

5. A drive mechanism for a vehicle having a wheeled frame, comprising: a drive tire on a wheel of the vehicle; a pair of bell cranks pivotally mounted on the frame; a drive shaft mounted on a first arm of said bell cranks, said drive shaft being provided with a pinion which has teeth making driving engagement with said tire; a spring connected to the second arm of one of said bell cranks to yieldingly urge the pinion into engagement with the drive tire; a drive control link connected to said second arm of said bell crank, said link affording means for rocking said bell cranks to move said pinion in and out of engagement with the drive tire; and a motor for driving said shaft.

6. A drive mechanism for a vehicle having a wheeled frame, comprising: a drive tire on a wheel of the vehicle; a pair of bell cranks pivotally mounted on the frame; a drive shaft mounted on a first arm of said bell cranks, said drive shaft being provided with a pinion which has teeth making driving engagement with said tire; a drive control link which makes a pin and slot connection with the second arm of one of said bell cranks, said link affording means for rocking said bell cranks to move said pinion in and out of engagement with the drive tire; a tension spring connected to said control link and to said second arm of said one bell crank; and a motor for driving said shaft.

References Cited in the file of this patent

UNITED STATES PATENTS

| | | |
|---|---|---|
| 680,891 | Smith | Aug. 20, 1901 |
| 963,146 | Harrison | July 5, 1910 |
| 1,124,214 | Davis | Jan. 5, 1915 |
| 1,198,098 | Bergh | Sept. 12, 1916 |
| 1,311,943 | Andrews | Aug. 5, 1919 |
| 1,627,252 | Peters | May 3, 1927 |
| 2,017,524 | Bolens | Oct. 15, 1935 |
| 2,335,541 | Ronning | Nov. 30, 1943 |
| 2,429,378 | Stuebner | Oct. 21, 1947 |
| 2,474,085 | Albright | June 21, 1949 |
| 2,519,749 | Edwards | Aug. 22, 1950 |
| 2,523,439 | May | Sept. 26, 1950 |
| 2,691,421 | Swanson | Oct. 12, 1954 |

FOREIGN PATENTS

| | | |
|---|---|---|
| 186,721 | Great Britain | Oct. 6, 1922 |